United States Patent
Hyun et al.

(10) Patent No.: US 12,019,545 B2
(45) Date of Patent: Jun. 25, 2024

(54) MEMORY SYSTEM AND OPERATING METHOD THEREOF

(71) Applicant: SK hynix Inc., Icheon-si (KR)

(72) Inventors: Sung Woo Hyun, Icheon-si (KR); Myoung Seo Kim, Icheon-si (KR); Jae Hoon Kim, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 0 days.

(21) Appl. No.: 18/059,763

(22) Filed: Nov. 29, 2022

(65) Prior Publication Data

US 2024/0012755 A1 Jan. 11, 2024

(30) Foreign Application Priority Data

Jul. 11, 2022 (KR) ........................ 10-2022-0084986

(51) Int. Cl.
*G06F 12/0804* (2016.01)
*G06F 12/0891* (2016.01)
*G06F 12/14* (2006.01)
*G06F 13/16* (2006.01)

(52) U.S. Cl.
CPC ...... *G06F 12/0804* (2013.01); *G06F 12/0891* (2013.01); *G06F 12/1416* (2013.01); *G06F 13/1668* (2013.01)

(58) Field of Classification Search
None
See application file for complete search history.

(56) References Cited

U.S. PATENT DOCUMENTS

| 10,950,292 | B1 | 3/2021 | SeyedzadehDelcheh et al. |
| 2015/0089183 | A1* | 3/2015 | Bains ................. G06F 12/0292 711/202 |
| 2016/0246525 | A1 | 8/2016 | Jeffrey et al. |
| 2022/0413959 | A1* | 12/2022 | Sethumadhavan ... G06F 3/0619 |

* cited by examiner

*Primary Examiner* — Brian R Peugh

(57) ABSTRACT

A memory system includes: a main memory device configured to include a plurality of row lines; a cache memory device configured to include a plurality of cache lines for caching data stored in the row lines, each cache line including cache data, a row hammer state value for storing an access number of a corresponding row line, and an access selection bit set according to the row hammer state value; and a memory controller configured to control an access operation to be performed on one of the main memory device and the cache memory device, which is selected according to the access selection bit of a cache-hit cache line, in response to a request from a host.

20 Claims, 14 Drawing Sheets

FIG. 7C
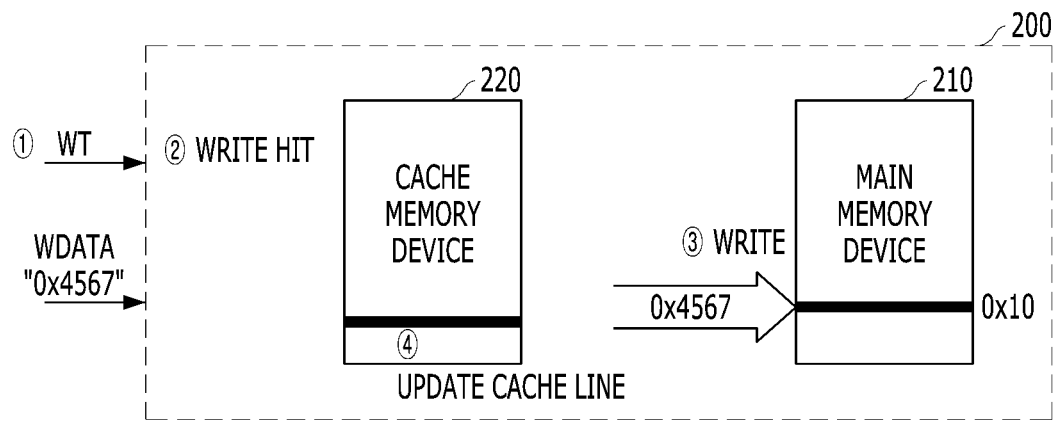
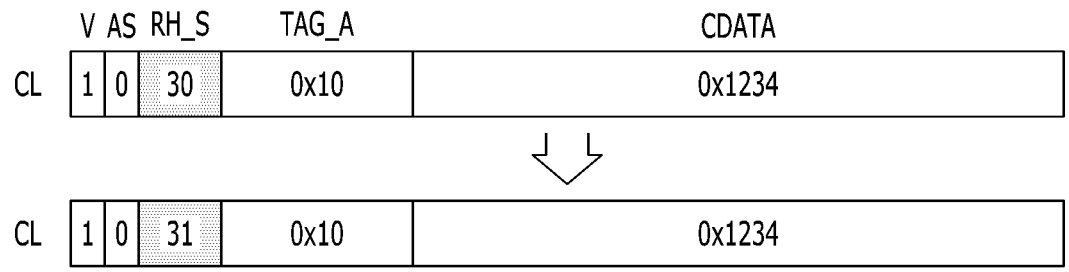
FIG. 7D
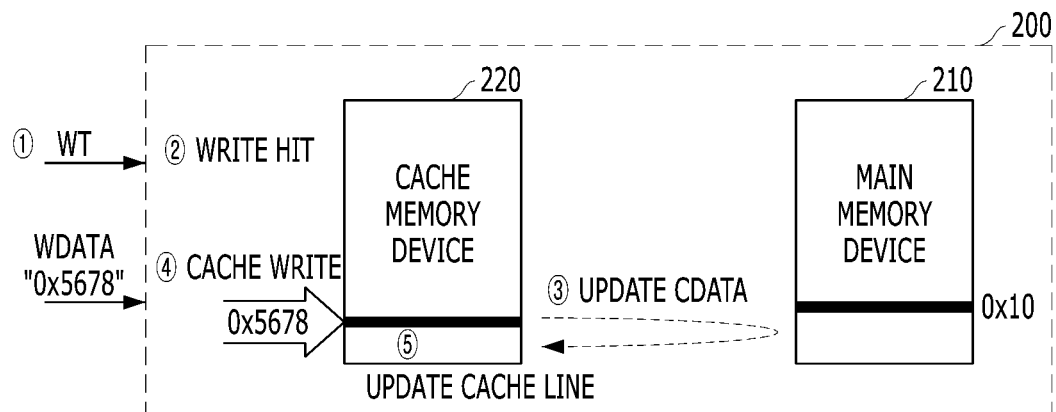
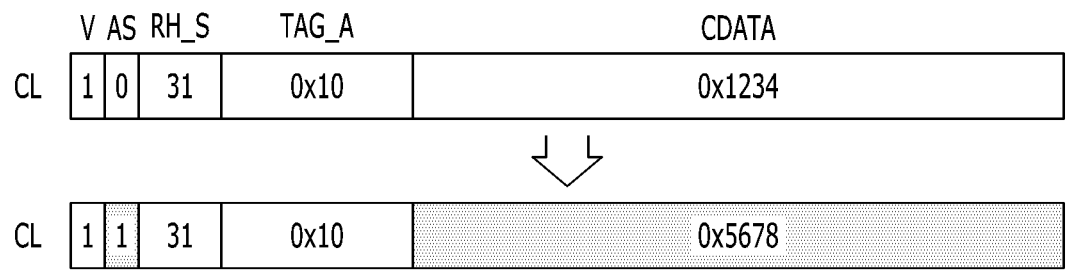

MEMORY SYSTEM AND OPERATING METHOD THEREOF

CROSS-REFERENCE TO RELATED APPLICATION

The present application claims the benefit of priority under 35 U.S.C. § 119(a) to Korean Patent Application No. 10-2022-0084986, filed in the Korean Intellectual Property Office on Jul. 11, 2022, which is incorporated herein by reference in its entirety.

BACKGROUND

1. Field

Various embodiments of the present invention relate to a semiconductor design technology, and more particularly, to a memory system including a semiconductor memory device, and an operating method thereof.

2. Description of the Related Art

Recently, the paradigm for the computing has changed to a ubiquitous computing environment in which computer systems can be used anytime and anywhere. Therefore, the use of portable electronic devices such as mobile phones, digital cameras and notebook computers has rapidly increased. Such portable electronic devices generally use a data storage device with a memory device. The data storage device is used to store data, which are used in the portable electronic devices. Since a data storage device using a memory device has no mechanical driver, the data storage device has excellent stability and durability, high information access speed, and low power consumption.

When a memory cell is continuously accessed, however, memory cells adjacent to the corresponding memory cell may be continuously exposed to electromagnetic fields that result from such access, and the possibility of distortion in stored data in the memory cells may increase. Such a phenomenon is referred to as row hammering.

SUMMARY

Embodiments of the present disclosure are directed to a memory system capable of storing the access number of each row line of a main memory device into a cache line of a cache memory device as a row hammer state value and managing an access to the main memory device based on the stored row hammer state value.

According to an embodiment of the present disclosure, a memory system includes a main memory device configured to include a plurality of row lines; a cache memory device configured to include a plurality of cache lines for caching data stored in the row lines, each cache line including cache data, a row hammer state value for storing an access number of a corresponding row line, and an access selection bit set according to the row hammer state value; and a memory controller configured to control an access operation to be performed on one of the main memory device and the cache memory device, which is selected according to the access selection bit of a cache-hit cache line, in response to a request from a host.

According to an embodiment of the present disclosure, an operating method of a memory system includes searching a cache-hit cache line from a plurality of cache lines of a cache memory device when an access operation on a row line of a main memory device is requested from a host; performing the access operation on one of the main memory device and the cache memory device according to an access selection bit of the cache-hit cache line; and increasing a row hammer state value of the cache-hit cache line when the access operation is performed on the row line, and setting access selection bit when the row hammer state value reaches a threshold.

According to the embodiments of the present disclosure, the memory system may prevent the data damage and distortion caused by the row hammering by allowing an access to a row line of the main memory device before the access number of the row line reaches a threshold while allowing the access to a cache line of the cache memory device when the access number of the row line reaches the threshold.

Furthermore, according to the embodiments of this disclosure, in a memory system communicating with a host through a Compute Xpress Link (CXL) interface, limited memory resources may be efficiently used by managing the access number of each row line using an existing cache memory device.

BRIEF DESCRIPTION OF THE DRAWINGS

FIGS. 7A to 7E are diagrams describing an exemplary operation of a memory system according to an embodiment of the present disclosure.

DETAILED DESCRIPTION

Figure 1:
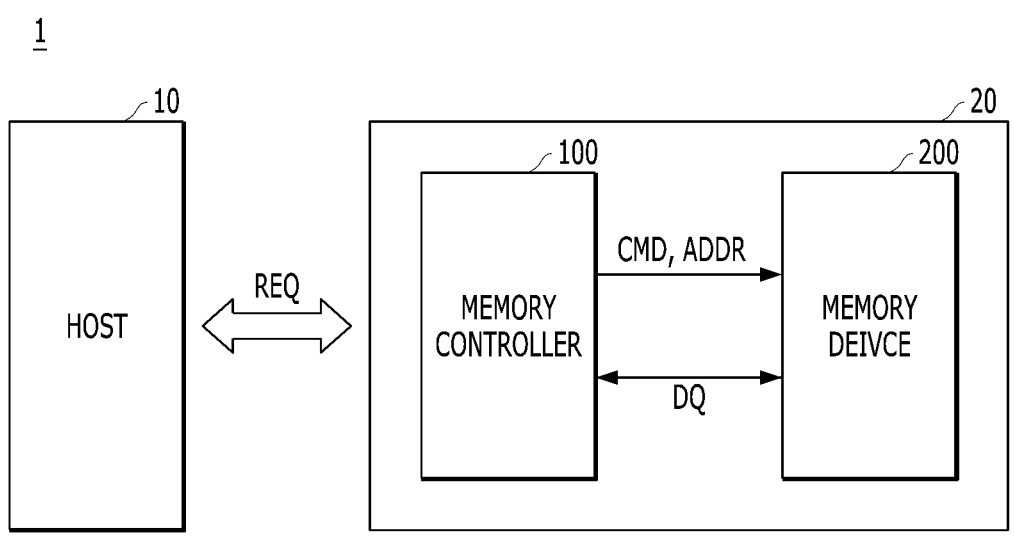
FIG. 1 is a block diagram illustrating a data storage device in accordance with an embodiment of the present disclosure.

Various embodiments of the present disclosure will be described below in more detail with reference to the accompanying drawings. The present disclosure may have embodiments in different forms and should not be construed as limited to the embodiments set forth herein. Rather, these embodiments are provided so that this disclosure will be thorough and complete, and will fully convey the scope of the present invention to those skilled in the art. Throughout this disclosure, like reference numerals refer to like parts throughout the various figures and embodiments of the present disclosure.

It will be understood that when an element is referred to as being "coupled" or "connected" to another element, it may mean that the two are directly coupled or the two are electrically connected to each other with another circuit intervening therebetween. It will be further understood that the terms "comprise", "include", "have", etc. when used in this specification, specify the presence of stated features, numbers, steps, operations, elements, components, and/or combinations of them but do not preclude the presence or addition of one or more other features, numbers, steps, operations, elements, components, and/or combinations thereof. In the present disclosure, the singular forms are intended to include the plural forms as well, unless the context clearly indicates otherwise.

In the following embodiments, in order to focus on a refresh operation, a description of a configuration related to a data input/output operation will be omitted and a row control operation will be mainly described.

FIG. 1 is a block diagram illustrating a data storage device 1 in accordance with an embodiment of the present disclosure.

Referring to FIG. 1, the data storage device 1 may include a host 10 and a memory system 20.

The host 10 may be an independent and practical processor that is referred to as a core, and may be implemented with one processor, or may be implemented as a multi-core processor including two or more processors. The host 10 may communicate with the memory system 20 using at least one of various communication standards or interfaces such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a compute express link (CXL), a universal flash storage (UFS), a secure digital (SD), a multimedia card (MMC), an embedded MMC (eMMC), a dual in-line memory module (DIMM), a registered DIMM (RDIMM), and a load reduced DIMM (LRDIMM).

The memory system 20 may store data or read out the stored data, according to a request provided from the host 10. The memory system 20 may be used as a main storage device or an auxiliary storage device of the host 10. The memory system 20 may be used as a device for storing data under the control of the host 10, and examples of devices include a cellular phone, a smartphone, an MP3 player, a laptop computer, a desktop computer, a game player, a TV, a tablet PC, or an in-vehicle infotainment system.

The memory system 20 may be fabricated as one of various types of devices according to a host interface that is a communication method with the host 10. For example, the memory system 20 may be configured as one of various types of memory modules such as an SSD, a multimedia card in a form of an MMC, an eMMC, an RS-MMC and a micro-MMC, a secure digital card in a form of an SD, a mini-SD and a micro-SD, a universal serial bus (USB) memory module, a universal flash storage (UFS) device, a personal computer memory card international association (PCMCIA) card type memory module, a peripheral component interconnection (PCI) card type memory module, a PCI express (PCI-e or PCIe) card type memory module, a compact flash (CF) card, a smart media card, and a memory stick.

The memory system 20 may be fabricated as any of various types of packages. For example, the memory module 1000 may be fabricated as any of various package types, such as a package on package (POP), a system in package (SIP), a system on chip (SOC), a multi-chip package (MCP), a chip on board (COB), a wafer-level fabricated package (WFP), and a wafer-level stack package (WSP).

In detail, the memory system 20 may include a memory controller 100 and a memory device 200.

The memory controller 100 may control the overall operation of the memory system 20 and control a data exchange between the host 10 and the memory device 200. The memory controller 100 may control a write (or program) operation and a read operation of the memory device 200 by generating a command CMD and an address ADDR according to a request REQ from the host 10 and providing the command CMD and the address ADDR to the memory device 200. For example, the memory controller 100 may provide data DQ provided from the host 10 to the memory device 200 during a write operation. The memory controller 100 may provide data DQ read from the memory device 200 to the host 10 during a read operation.

The memory device 200 may operate in response to the control of the memory controller 100. The memory device 200 may perform the write (or program) operation, the read operation, and the like according to the command CMD, the address ADDR, and/or the data DQ provided from the memory controller 100.

In embodiments, the memory device 200 may be a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access random access memory (PRAM), a magnetoresistive random access memory (MRAM), a ferroelectric random access memory (FRAM), a spin transfer torque random access memory (SU-RAM), or the like.

Hereinafter, data transmitted between the host 10 and the memory controller 100 are referred to as host data HDATA, data DQ provided from the memory controller 100 to the memory device 200 during the write operation are referred to as write data WDATA, and data DQ read from the memory device 200 during read operation are referred to as read data RDATA.

Figure 2:
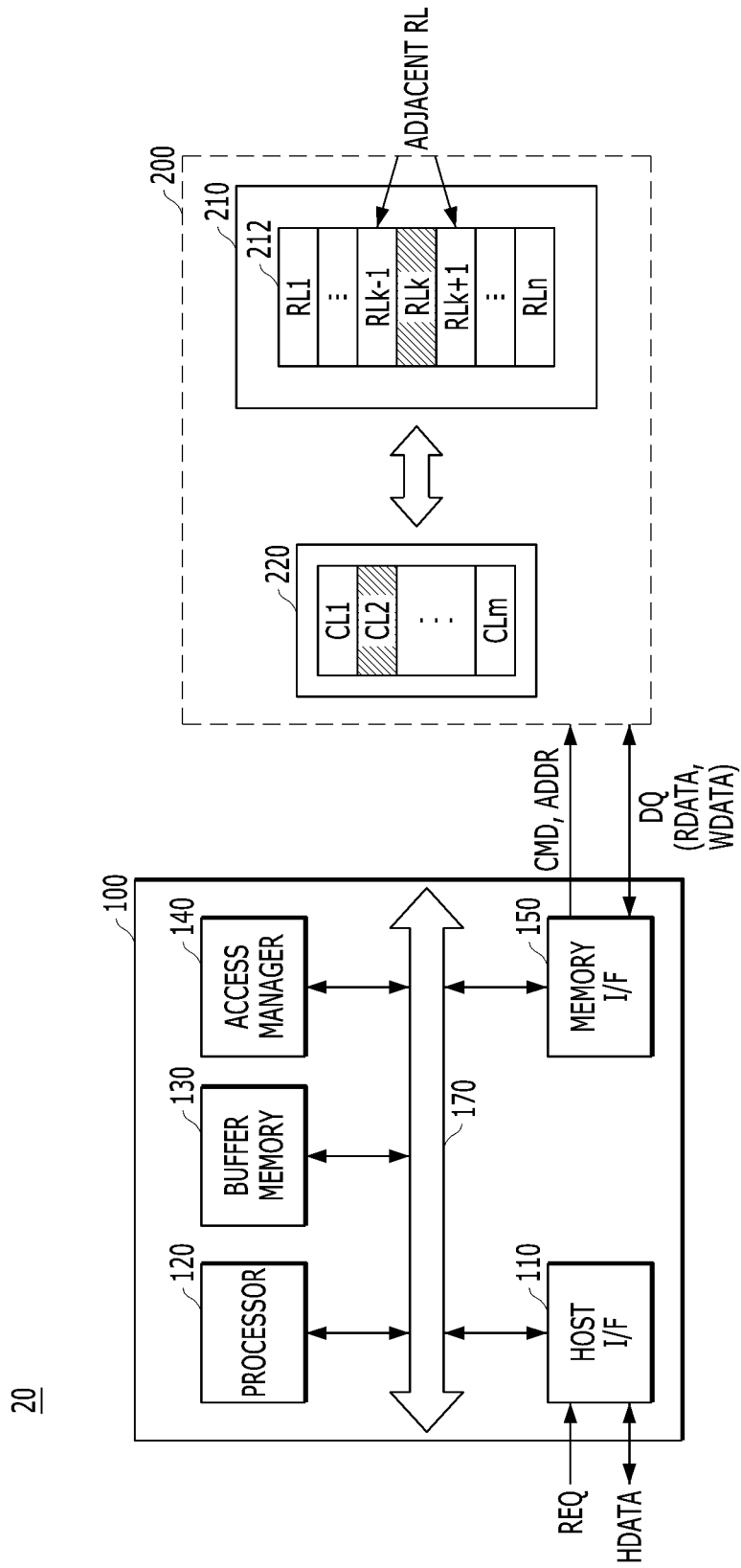
FIG. 2 is a configuration diagram illustrating a memory system in accordance with an embodiment of the present disclosure.

FIG. 2 is a configuration diagram illustrating a memory system 20 in accordance with an embodiment of the present disclosure.

Referring to FIG. 2, the memory controller 100 may provide the command CMD and the address ADDR to the memory device 200, exchange the host data HDATA with the host 10, and exchange the data DQ with the memory device 200, in response to the request REQ of the host 10. For example, the memory controller 100 may provide the read data RDATA read from the memory device 200 to the host 10 as the host data HDATA during the read operation, and may provide the host data HDATA provided from the host 10 as the write data WDATA to the memory device 200.

The memory device 200 may receive the command CMD, the address ADDR, and/or the data DQ provided from the memory controller 100. When the command CMD indicates a write operation, the memory device 200 may write the write data WDATA in a memory area selected by the address ADDR. When the command CMD indicates a read operation, the memory device 200 may read and output the read data RDATA from a memory area selected by the address ADDR to the memory controller 100. The memory device 200 may include a main memory device 210 and a cache memory device 220 for caching data stored in the main memory device 210. The main memory device 210 may be configured with at least one of the memory devices described above with reference to FIG. 1. The cache memory device 220 may include a dynamic random access memory (DRAM) and a static RAM (SRAM). Preferably, the main memory device 210 may be implemented as DRAM, and the cache memory device 220 may be implemented as SRAM.

The main memory device 210 may include a memory cell array 212 in which a plurality of memory cells are arranged in an array form between a plurality of word lines (hereinafter referred to as row lines (RL1 to RLn (where n is a natural number)) and a plurality of bit lines (hereinafter referred to as column lines). The main memory device 210 may access a region of the memory cell array 212 selected by the address ADDR to perform an operation indicated by the command CMD. For example, the main memory device 210 may perform a write (or program) operation, a read operation, and the like. During the write operation, the main memory device 210 may program the write data WDATA in a region selected by the address ADDR. During the read operation, the main memory device 210 may read the read data RDATA from the region selected by the address ADDR. In these instances, the address ADDR may include a row address and a column address, and the region selected by the address ADDR may be an area specified by row lines designated by the row address and column lines designated by the column address.

Hereinafter, in embodiments of the present disclosure, an active operation performed in units of rows may be defined as an access operation. For example, an access operation may include a write (or program) operation and a read operation that requires an operation of accessing a row line designated by a row address. In addition, in embodiments the main memory device 210 is a memory device with a memory cell array including row lines. Without limitation to any particular type or implementation, the memory device may generate row hammering.

The cache memory device 220 is a high-speed memory device that temporarily stores information between a processor (i.e., the memory controller 100) having a relatively high processing speed and the main memory device 210 having a relatively low processing speed. The cache memory device 220 may include a plurality of cache lines CL1 to CLm (where m is a natural number) for caching data stored in the row lines RL1 to RLn. Preferably, the number m of the cache lines CL1 to CLm may be smaller than the number n of the row lines RL1 to RLn (i.e., m<n). In an embodiment, each of the cache lines CL1 to CLm of the cache memory device 220 may correspond to one of the row lines RL1 to RLn, and may include a row hammer state value ("RH_S" in FIG. 3) for storing the access number of the corresponding row line, and an access selection bit ("AS" in FIG. 3) set according to the row hammer state value RH_S. A detailed configuration of the cache memory device 220 will be described with reference to FIG. 3.

Meanwhile, the cache memory device 220 may be characterized as having to delete existing data for loading new data when the device is cache-full due to limited space. To this end, data with low data reference probability may be deleted according to a cache replacement policy, or there may be write-back to the main memory device 210 and data in that space may be replaced with new data.

The memory controller 100 may include a host interface (I/F) 110, a processor 120, a buffer memory 130, an access manager 140, a memory interface (I/F) 150, and a bus 170.

The host interface 110 may be configured to communicate with the host coupled to the memory system 20 under the control of processor 120. For example, the host interface 110 may receive a request REQ and the host data HDATA from the host, and may receive the data DQ read from the memory device 200 through the memory interface 150 and output the data DQ to the host as the host data HDATA. In particular, in an embodiment of the present disclosure, the host interface 110 may communicate with the host through a Compute eXpress Link (CXL) interface or a Dual Inline Memory Module (DIMM) interface.

The processor 120 may perform various operations or include firmware for controlling the memory device 200. The processor 120 may include a micro control unit (MCU) and a central processing unit (CPU). The processor 120 may receive the request REQ and the host data HDATA provided from the host through the host interface 110. The processor 120 may generate various commands, for example, an active command, a read command and a write command, and an address, corresponding to the request REQ, and transmit them to the memory device 200 together with the host data HDATA through the memory interface 150. The processor 120 may generally control the host interface 110, the buffer memory 130, the access manager 140, and the memory interface 150.

The buffer memory 130 may temporarily store data to be transmitted from the host to the memory device 200 or from the memory device 200 to the host. Preferably, the buffer memory 130 may be configured as a random access memory such as DRAM and SRAM. Although FIG. 2 shows that the buffer memory 130 is located in the memory controller 100, the present disclosure is not particularly limited thereto, and the buffer memory 130 may be located outside the memory controller 100.

The access manager 140 may manage the cache lines CL1 to CLm of the cache memory device 220. For example, when assuming that a second cache line CL2 corresponds to a k-th row line RLk, whenever an access operation is performed on the k-th row line RLk (i.e., when the k-th row line RLk is access or active), the access manager 140 may increase the row hammer state value RH_S of the second cache line CL2, which is a cache-hit cache line. In addition, the access manager 140 may set the access selection bit AS of the cache-hit second cache line CL2 according to the row hammer state value RH_S. For example, the access manager 140 may set a threshold for conditions in which data corruption due to the row hammer occurs, set the access selection bit AS to a low bit when the row hammer state value RH_S is smaller than the threshold, and set the access selection bit AS to a high bit when the row hammer state value RH_S reaches the threshold. The access manager 140 may control the access operation to be performed on a cache-hit cache line when an access selection bit AS of the cache-hit cache line is a high bit, and may control the access operation to be performed on a row line of the main memory device 320 or the cache-hit cache line when the access selection bit AS of the cache-hit cache line is a low bit.

The memory interface 150 may be configured to communicate with the memory device 200 under the control of the processor 120. For example, the memory interface 150 may transmit the command CMD, the address ADDR, and/or the write data WDATA to the memory device 200, and may transmit the read data RDATA read from the memory device 200 to the host interface 110.

As described above, in accordance with the present disclosure, a memory controller 100 is configured to control the access operation to be performed on one of the main memory device 210 and the cache memory device 220, according to the access selection bit AS of the cache-hit cache line when the access operation is performed in response to the request REQ from the host. Thus, the memory system 20 may allow access to the row line of the main memory device 210 before the access number of the row line reaches a threshold while allowing the access to the cache line of the cache memory device 220 when the access number of the row line reaches the threshold. Accordingly, it is possible to prevent the row hammering phenomenon in which data of memory cells coupled to a specific row line or adjacent row lines are damaged due to the high number of activations of the specific row line.

Figure 3:
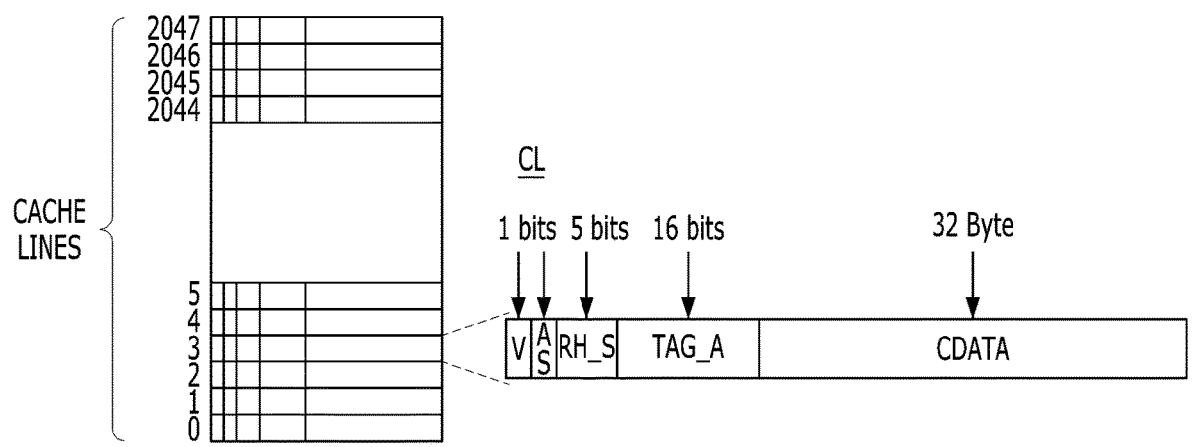
FIG. 3 is a detailed configuration diagram illustrating a cache memory device shown in FIG. 2 in accordance with an embodiment of the present disclosure.

FIG. 3 is a detailed configuration diagram illustrating a cache memory device 220 shown in FIG. 2 in accordance with an embodiment of the present disclosure.

Referring to FIG. 3, the cache memory device 220 may include a plurality of cache lines for caching data stored in the main memory device 210. For example, in FIG. 3, a cache memory device 220 including first to 2048-th cache lines is illustrated.

Each of the first to 2048-th cache lines may include fields such as an effective bit V, an access selection bit AS, a row hammer state value RH_S, a tag address TAG_A, and cache data CDATA. For example, FIG. 3 illustrates each cache line CL including fields of 1-bit effective bit V, 1-bit access selection bit AS, 5-bit row hammer state value RH_S, 16-bit tag address TAG, and 32-byte cache data CDATA. According to an embodiment, a line index for distinguishing the first to 2048-th cache lines may be additionally included in each cache line.

The effective bit V may include information indicating whether the fields in the corresponding cache line are valid, that is, whether the corresponding cache line is in use. The effective bit V may be set to a high bit when the fields are valid. Hereinafter, when a specific bit is a high bit, it will be described as being set, and when the specific bit is a low bit, it will be described as being released.

The cache data CDATA may be write data WDATA stored in the main memory device 210 or read data RDATA to be read from the main memory device 210.

The tag address TAG_A may include address information (i.e., row address information) that specifies a location of a row line of the main memory device 210 corresponding to the corresponding cache line. For reference, when an access operation is requested from the host 10, the memory controller 100 may determine cache hit or cache miss by searching for the cache-hit cache line based on the tag address TAG_A included in each cache line.

The row hammer state value RH_S may indicate the access number of the row line corresponding to the corresponding cache line. The row hammer state value RH_S may have a value that increases by "+1" whenever the corresponding row line is accessed (or active), that is, whenever an access operation (e.g., a read operation or a write operation) is performed on the corresponding row line. In FIG. 3, the row hammer state value RH_S is formed of 5 bits, but the disclosed embodiments are not limited thereto, and the row hammer state value RH_S may be set to 1 byte (i.e., 8 bits) or less.

The access selection bit AS may include information that indicates the device performing an access operation, such as the main memory device 210 or the cache memory device 220. For example, when the access selection bit AS is a low bit, the access operation may be performed on the row line of the main memory device 210 corresponding to the tag address TAG_A, and when the access selection bit AS is a high bit, the access operation may be performed on the corresponding cache line.

Hereinafter, a method of operating a memory system according to an embodiment of the present disclosure will be described with reference to FIGS. 1 to 6.

Figure 4:
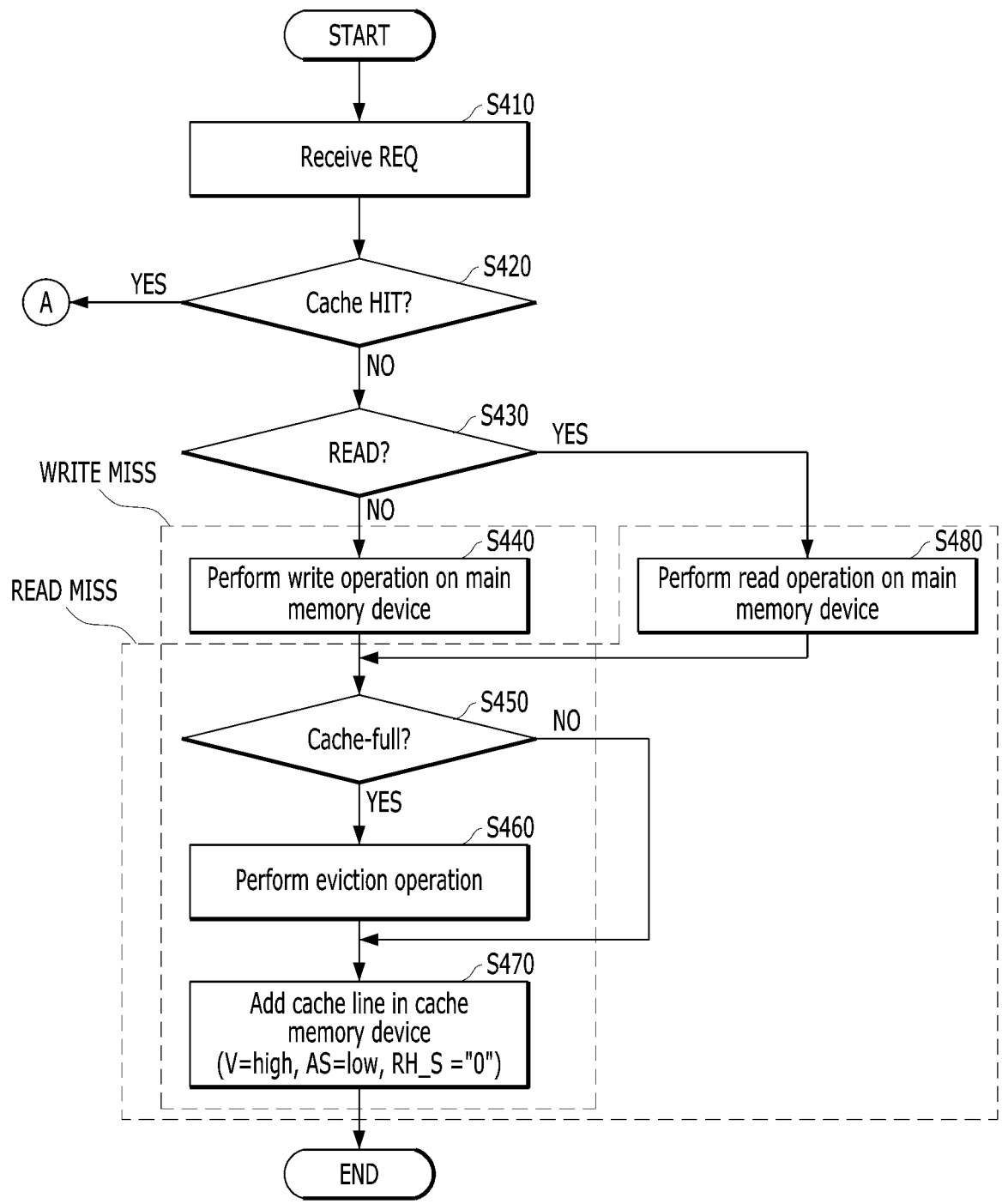
FIGS. 4 to 6 are flow charts for describing an operation of a memory system in accordance with an embodiment of the present disclosure.
Figure 5:
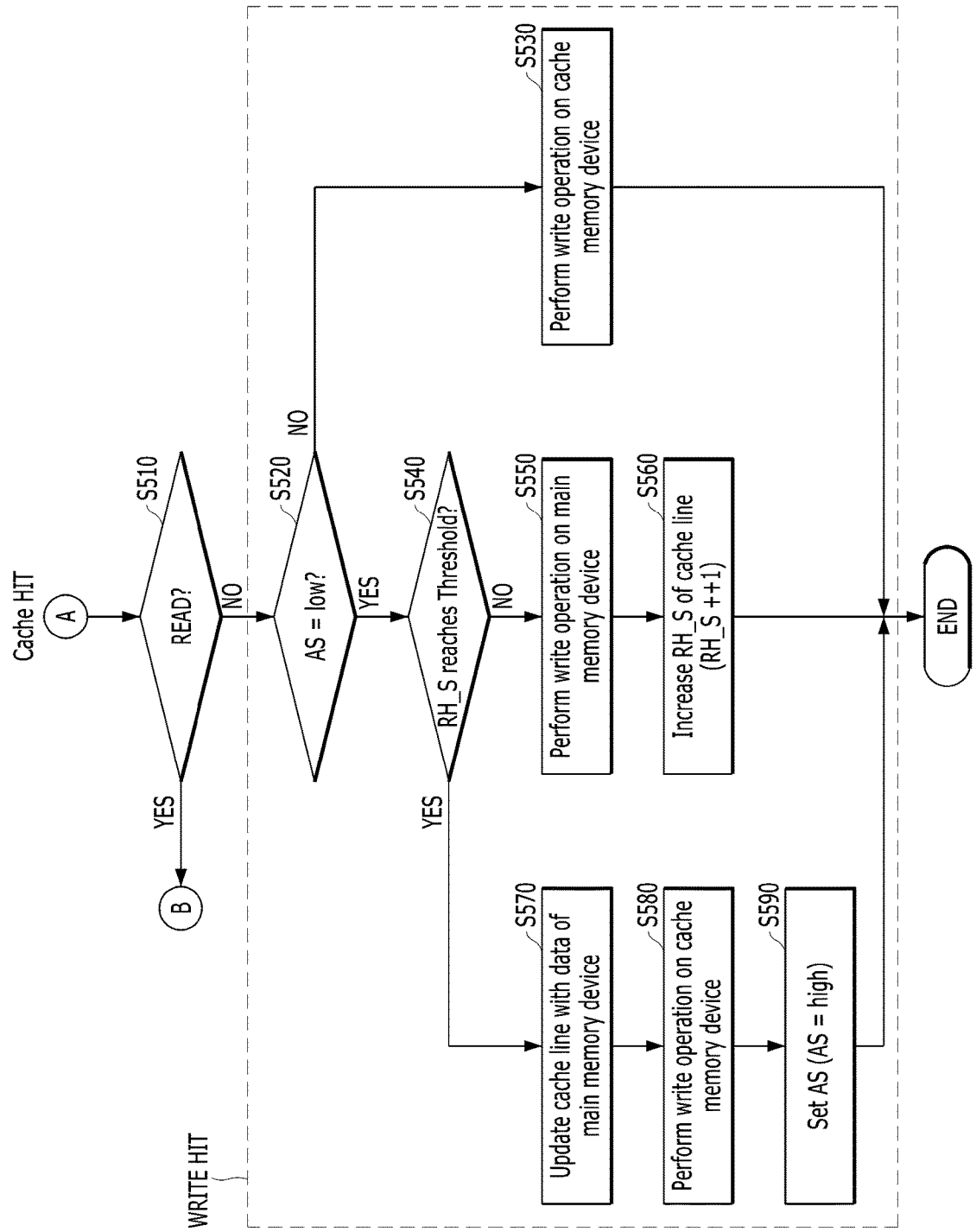
Figure 6:
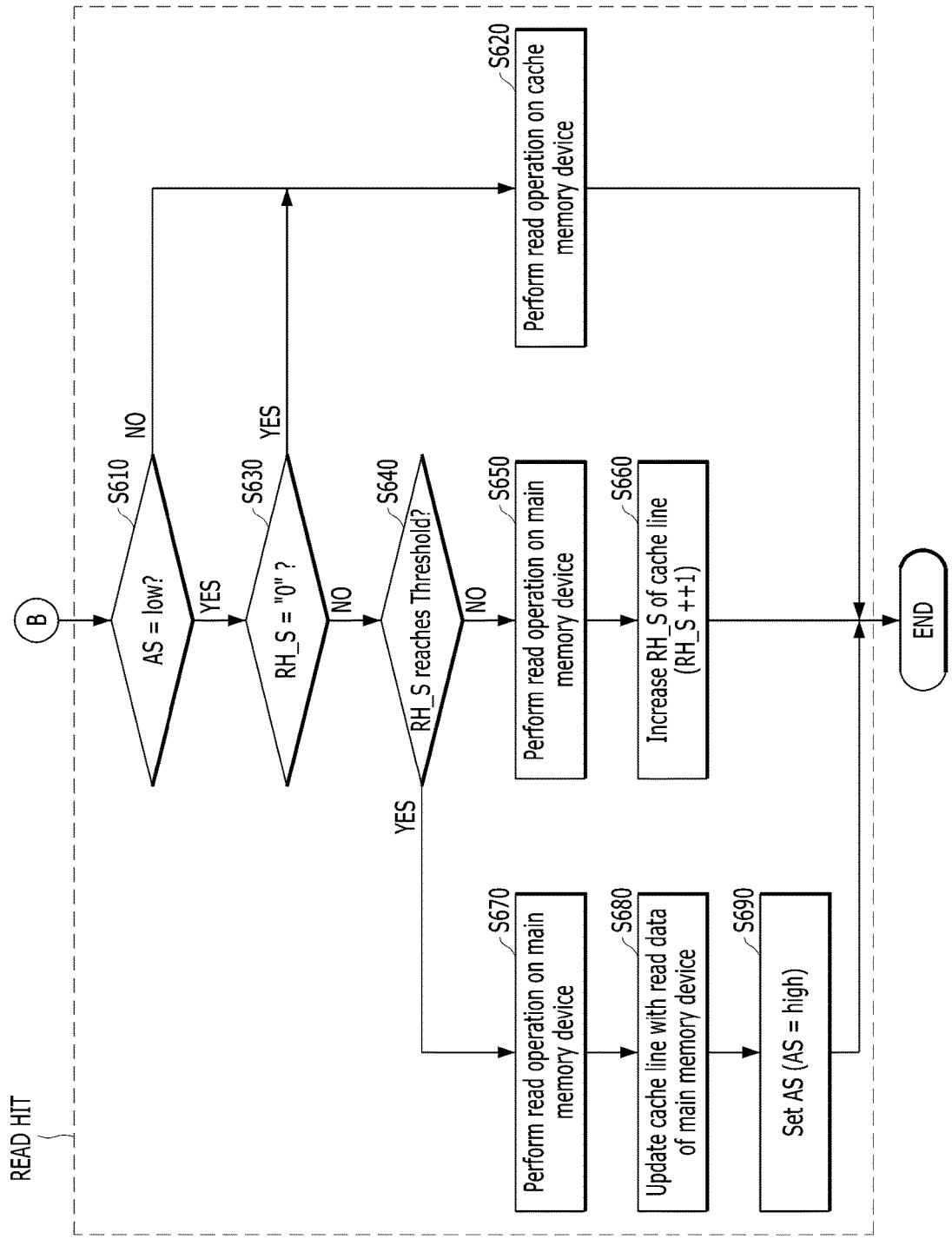

FIGS. 4 to 6 are flow charts for describing an operation of a memory system in accordance with an embodiment of the present disclosure.

Referring to FIG. 4, a memory controller 100 may search a cache memory device 220 for a cache line having a tag address TAG_A corresponding to a request REQ when the request REQ is received from the host 10 (at S410). When a cache line (i.e., a cache-hit cache line) having the tag address TAG_A corresponding to the request REQ is searched ("YES" of S420), an operation "A" will be described with reference to FIGS. 5 to 6.

If the cache-hit cache line is not searched ("NO" of S420), that is, in case of cache miss, the memory controller 100 may distinguish whether the request REQ is a request indicating a write operation or a read operation.

When the request REQ is a request indicating a write operation ("NO" of S430), the memory controller 100 may control the memory device 200 to perform a write miss operation ("WRITE MISS"). The memory controller 100 may provide a write command CMD, an address ADDR, and write data WDATA corresponding to the request REQ to the main memory device 210, and the main memory device 210 may perform a write operation of programming the write data WDATA in an area selected by the address ADDR (at S440). In this case, one or more row lines may be selected by a row address and one or more column lines may be selected by a column address, from among the addresses ADDR, and a write operation may be performed in a region specified by the selected row lines and the selected column lines.

Thereafter, the memory controller 100 may check whether the cache memory device 220 has an empty cache line. For example, the memory controller 100 may search for an empty cache line based on the effective bit V. The memory controller 100 may check the effective bit V of each cache line of the cache memory device 220 and obtain an empty cache line in which the effective bit V is released to a low bit ("NO" of S450).

If there is no empty cache line, the memory controller 100 may determine that the cache memory device 220 is cache-full ("YES" of S450) and may perform an eviction operation on one of the occupied cache lines by applying an eviction algorithm according to a cache replacement policy. For example, an eviction algorithm may be used based on a First-In First-Out (FIFO) list that selects the oldest cache line among the cache lines, a Least Frequently Used (LFU) list that selects the least used cache line among the cache lines from loading on the cache memory device 220, and a Last Recently Used (LRU) list that selects the longest unused cache line among the cache lines from loading on the cache memory device 220. The memory controller 100 may initialize all fields of the selected cache line by applying the eviction algorithm. The memory controller 100 may write-back the cache data CDATA to the row line of the main memory device 210 corresponding to the tag address ADDR when the access selection bit AS of the selected cache line is set to a high bit. Accordingly, the memory controller 100 may acquire an empty cache line (at S460).

When the empty cache line is acquired, the memory controller 100 may add a new cache line into the cache memory device 220 by storing the write data WDATA as the cache data CDATA of the acquired cache line and setting the effective bit V of the acquired cache line to a high bit. In addition, the memory controller 100 may release the access selection bit AS of the acquired cache line to a low bit, and initialize the row hammer state value RH_S to "0" (at S470).

Meanwhile, when the request REQ is a request indicating a read operation ("YES" of S430), the memory controller 100 may control the memory device 200 to perform a read miss operation ("READ MISS"). The memory controller 100 may provide a read command CMD and an address ADDR corresponding to the request REQ to the main memory device 210, and the main memory device 210 may perform a read operation of reading read data RDATA from an area selected by the address ADDR (at S480).

Thereafter, the memory controller 100 may check whether the cache memory device 220 has an empty cache line based on the effective bit V. When there is no empty cache line ("YES" of S450), the memory controller 100 may obtain an empty cache line by performing an eviction operation (at S460), as described above. After acquiring the empty cache line, the memory controller 100 may add a new cache line into the cache memory device 220 by storing the read data RDATA as the cache data CDATA of the acquired cache line and setting the effective bit V of the acquired cache line to a high bit. In addition, the memory controller 100 may release the access selection bit AS of the acquired cache line to a low bit, and initialize the row hammer state value RH_S to "0" (at S470).

Referring to FIG. 5, the operation "A" on the cache-hit cache line ("YES" of S420) is illustrated. In the case of cache hit, the memory controller 100 may distinguish whether the request REQ is a request indicating a write operation or a read operation. When the request REQ is a request indicating a read operation ("YES" of S510), an operation "B" will be described with reference to FIG. 6.

Referring to FIG. 5, if the request REQ is a request indicating a write operation ("NO" of S510), the memory controller 100 may control the memory device 200 to perform a write hit operation ("WRITE HIT"). The memory controller 100 may provide a write command CMD, an address ADDR, and write data WDATA corresponding to the request REQ to the memory device 200. The memory controller 100 may check whether the access selection bit AS of the cache-hit cache line is set to a high bit or released to a low bit.

When the access selection bit AS of the cache-hit cache line is set to the high bit ("NO" of S520), the memory controller 100 may control the cache memory device 220 to perform a write operation of writing the write data WDATA into the cache-hit cache line of the cache memory device 220 (at S530). Accordingly, the write operation is performed only on the cache-hit cache line without access to the main memory device 210, thereby preventing data damage and distortion of the main memory device 210 due to the row hammering.

When the access selection bit AS of the cache-hit cache line is released to the low bit ("YES" of S520), the memory controller 100 hit cache line has reached a threshold. If the row hammer state value RH_S does not reach the threshold ("NO" of S540), then the memory controller 100 may control the main memory device 210 to perform a write operation of writing the write data WDATA into an area selected by the address ADDR (at S550). After the write operation is performed, the memory controller 100 may increase the row hammer state value RH_S of the cache-hit cache line by "+1" (at S560).

When a row hammer state value RH_S reaches a threshold ("YES" of S540), the memory controller 100 may read data from the row line of the main memory device 210 corresponding to the address ADDR and update the read data to the cache data CDATA of the cache-hit cache line (at S570). In addition, the memory controller 100 may control the cache memory device 220 to perform a write operation of writing the write data WDATA into the cache-hit cache line (at S580). For example, the write operation may include a masked write operation or a partial write operation. After the write operation is performed, the memory controller 100 may set the access selection bit AS of the cache-hit cache line to a high bit (at S590).

According to an embodiment, when the row hammer state value RH_S reaches the threshold ("YES" of S540), the memory controller 100 may control the main memory device 210 to perform a write operation, and update data read from the row line on which the write operation is performed, to the cache data CDATA of the cache-hit cache line. Meanwhile, in a memory system in which a masked write operation or a partial write operation is not performed, an operation (at S570) of reading data from the row line and updating the read data to cache data CDATA of the cache-hit cache line may be omitted.

Referring to FIG. 6, an operation "B" is illustrated where the request REQ calls for a read operation ("YES" of S510). The memory controller 100 may control the memory device 200 to perform a read hit operation ("READ HIT"). The memory controller 100 may provide a read command CMD and an address ADDR corresponding to the request REQ to the memory device 200. The memory controller 100 may check whether the access selection bit AS of the cache-hit cache line is set to a high bit or released to a low bit.

When the access selection bit AS of the cache-hit cache line is set to the high bit ("NO" of S610), the memory controller 100 may control the cache memory device 220 to perform a read operation of reading read data RDATA from the cache-hit cache line (at S620). Accordingly, the read operation is performed only on the cache-hit cache line without access to the main memory device 210, thereby preventing data damage and distortion of the main memory device 210 due to the row hammering.

When the access selection bit AS of the cache-hit cache line is released to the low bit ("YES" of S610), the memory controller 100 hit cache line is set to "0". If the access selection bit AS is released to the low bit and the row hammer state value RH_S is "0" ("YES" of S630), then no additional access operation has been performed after the new cache line described in FIG. 4 is added. That is, since data stored in the row line are identical to the cache data CDATA of the cache line when no additional access operation is performed after the new cache line is added, the memory controller 100 may control the cache memory device 220 to perform a read operation (at S620). As a result, it is possible to prevent the row hammer and reduce operation latency and overhead.

Referring to FIG. 6, when the row hammer state value RH_S is greater than "0" but does not reach the threshold ("NO" of S630 & "NO" of S640), the memory controller 100 may control the main memory device 210 to perform a read operation of reading the read data RDATA from an area selected by the address ADDR (at S650). After the read operation is performed, the memory controller 100 may increase the row hammer state value RH_S of the cache-hit cache line by "+1" (at S660).

Alternatively, when the row hammer state value RH_S reaches the threshold ("YES" of S640), the memory controller 100 may control the main memory device 210 to perform a read operation of reading the read data RDATA (at S670), and update the read data RDATA to the cache data CDATA of the cache-hit cache line (at S680). After the read operation is performed, the memory controller 100 may set the access selection bit AS of the cache-hit cache line to a high bit (at S690).

Hereinafter, a read operation or a write operation according to embodiments of the present disclosure will be described in a detailed example.

FIGS. 7A to 7E are diagrams describing an exemplary operation of a memory system according to an embodiment of the present disclosure. FIGS. 7A to 7E show a state of a cache line when write operations are sequentially performed.

Figure 7A:
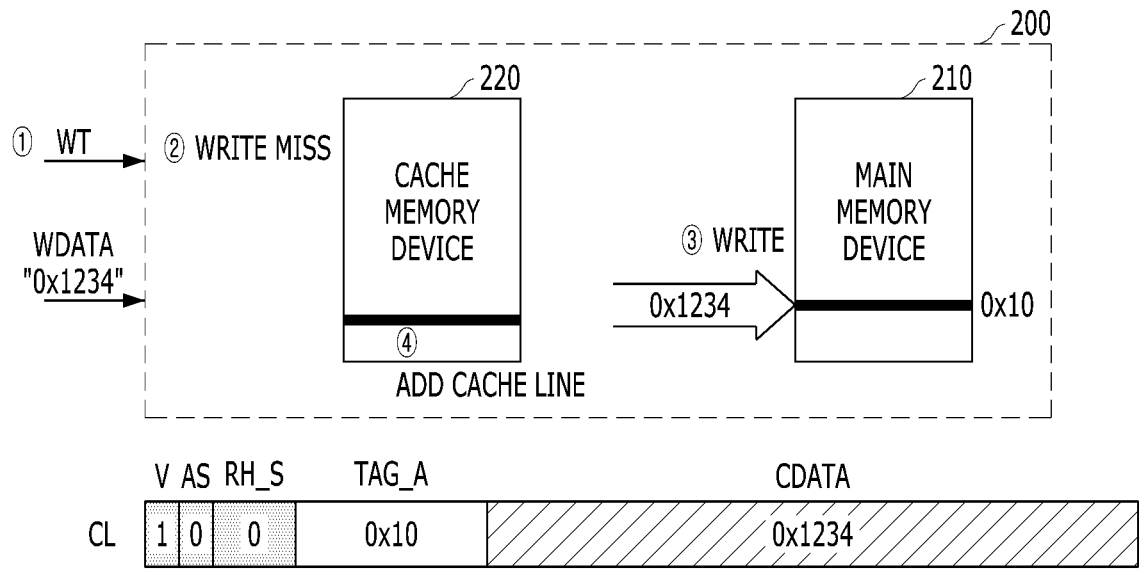

Referring to FIG. 7A, a memory controller 100 (not illustrated) may generate a write command CMD (hereinafter referred to as "WT"), an address ADDR of "0x10", and write data WDATA of "0x1234" according to a request REQ from the host 10 (①). If a cache line (i.e., a cache-hit cache line) with a tag address TAG_A corresponding to the address ADDR of "0x10" is not searched (②, "WRITE MISS"), then the memory controller 100 may control the main memory device 210 to perform a write operation (③) of writing the write data WDATA of "0x1234" into an area selected by the address ADDR of "0x10". After that, the memory controller 100 may acquire an empty cache line from the cache memory device 220, and add a new cache line into the cache memory device 220 by storing the write data WDATA of "0x1234" as cache data CDATA of the acquired cache line, and setting an effective bit V to a high bit. The memory controller 100 may release an access selection bit AS of the added cache line to a low bit, and initialize a row hammer state value RH_S to "0" (④). On the other hand, when an empty cache line is not searched, the memory controller 100 may perform an eviction operation of selecting one of the occupied cache lines by applying an eviction algorithm according to a cache replacement policy.

Figure 7B:
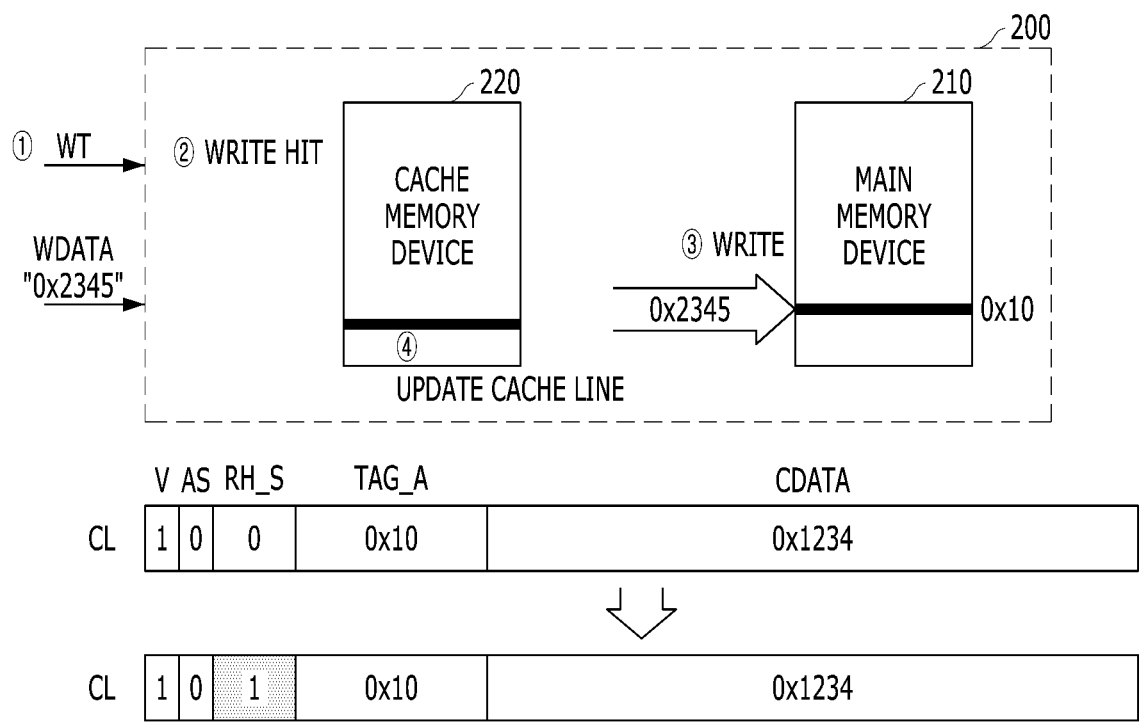

Referring to FIG. 7B, the memory controller 100 may generate a write command WT, an address ADDR of "0x10", and write data WDATA of "0x2345" corresponding to the request REQ from the host 10 (①). Since the cache-hit cache line is searched (②, "WRITE HIT") based on the address ADDR of "0x10", the memory controller 100 may check whether an access selection bit AS of the cache-hit cache line is set to a high bit or released to a low bit. If the access selection bit AS is released to the low bit and the row hammer state value RH_S is "0", then the memory controller 100 may control the main memory device 210 to perform a write operation (③) of writing the write data WDATA of "0x2345" in the area selected by the address ADDR of "0x10". After the write operation is performed, the memory controller 100 may update the cache-hit cache line by increasing the row hammer state value RH_S by "+1" (④).

Referring to FIG. 7C, before the row hammer state value RH_S reaches a threshold (e.g., "31"), the cache-hit cache line may be updated ((④)) by incrementing the row hammer state value RH_S by "+1" whenever an access operation is performed on the row line corresponding to the address ADDR of "0x10".

Referring to FIG. 7D, the memory controller 100 may generate a write command WT, an address ADDR of "0x10", and write data WDATA of "0x5678" corresponding to the request REQ from the host 10 (①). Since the row hammer state value RH_S of the cache-hit cache line has reached the threshold "31" (②), the memory controller 100 may read data from the row line of the main memory device 210 corresponding to the address ADDR of "0x10" and update the read data to the cache data CDATA of the cache-hit cache line (③). In addition, the cache memory device 220 may perform a write operation of writing the write data WDATA of "0x5678" to the cache-hit cache line (④). After the write operation is performed, the memory controller 100 may update the cache-hit cache line by setting the access selection bit AS to a high bit (⑤).

Figure 7E:
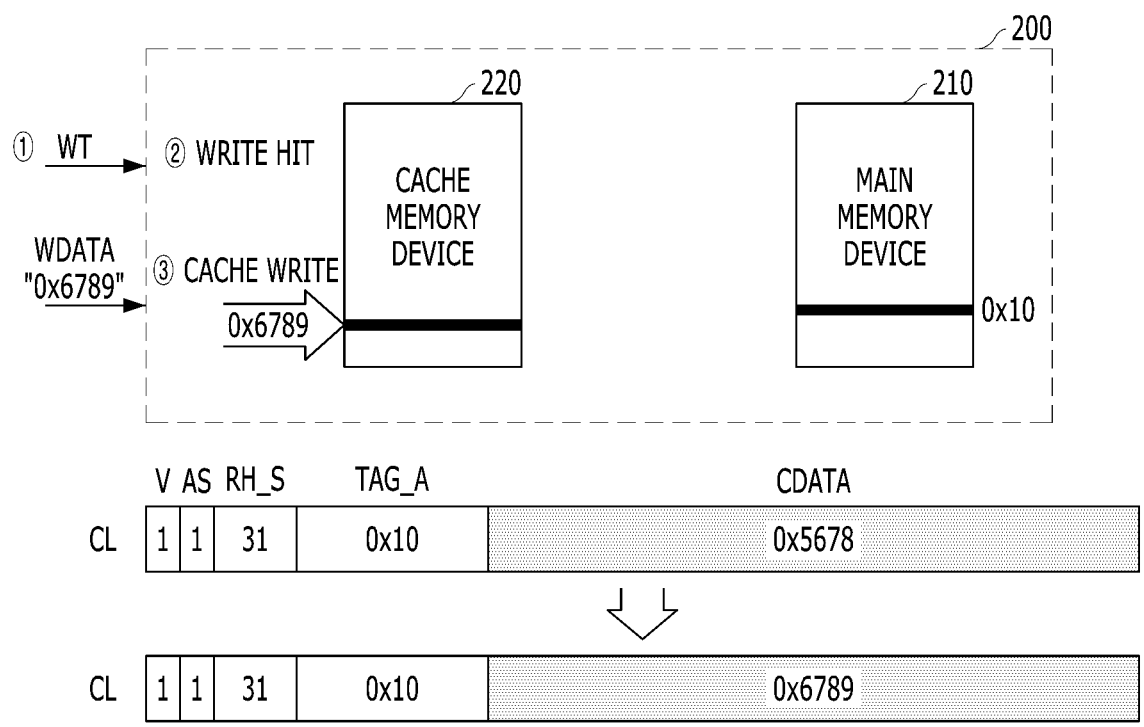

Referring to FIG. 7E, the memory controller 100 may generate a write command WT, an address ADDR of "0x10", and write data WDATA of "0x6789" corresponding to the request REQ from the host 10 (①). Since the access selection bit AS of the cache-hit cache line is set to the high bit (②), the memory controller 100 may control the cache memory device 220 to perform a write operation (③) of writing the write data WDATA of "0x6789" into the cache hit. That is, after the access selection bit AS is set to the high bit, the read or write operation may be performed only on the cache-hit cache line without accessing the main memory device 210 whenever the read or write operation is performed on the address ADDR of "0x10". Accordingly, the data damage and distortion of the main memory device 210 due to the row hammer may be prevented.

FIGS. 8A to 8H are diagrams describing an exemplary operation of a memory system according to an embodiment of the present disclosure. FIGS. 8A to 8H show a state of a cache line when read operations and write operations are sequentially performed.

Figure 8A:
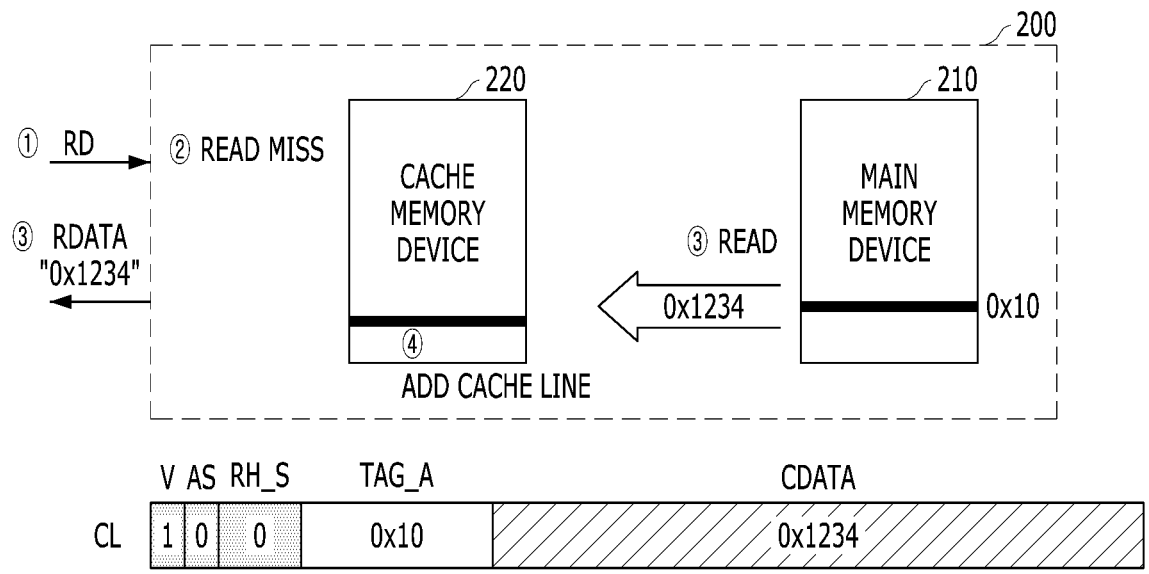
FIGS. 8A to 8H are diagrams describing an exemplary operation of a memory system according to an embodiment of the present disclosure.

Referring to FIG. 8A, a memory controller 100 may generate a read command CMD (hereinafter referred to as "RD") and an address ADDR of "0x10" according to a request REQ from the host 10 (①). If a cache line (i.e., a cache-hit cache line) with a tag address TAG_A corresponding to the address ADDR of "0x10" is not searched (②, "READ MISS"), then the memory controller 100 may control the main device to perform a read operation (③) of reading read data RDATA from an area selected by the address ADDR of "0x10". Thereafter, the memory controller 100 may obtain an empty cache line from the cache memory device 220, and add a new cache line into the cache memory device 220 by storing the read data RDATA of "0x1234" as cache data CDATA of the acquired cache line, and setting an effective bit V to a high bit. The memory controller 100 may release an access selection bit AS of the added cache line to a low bit, and initialize a row hammer state value RH_S to "0" (④). On the other hand, when an empty cache line is not searched, the memory controller 100 may perform an eviction operation of selecting one of the occupied cache lines by applying an eviction algorithm according to a cache replacement policy.

Figure 8B:
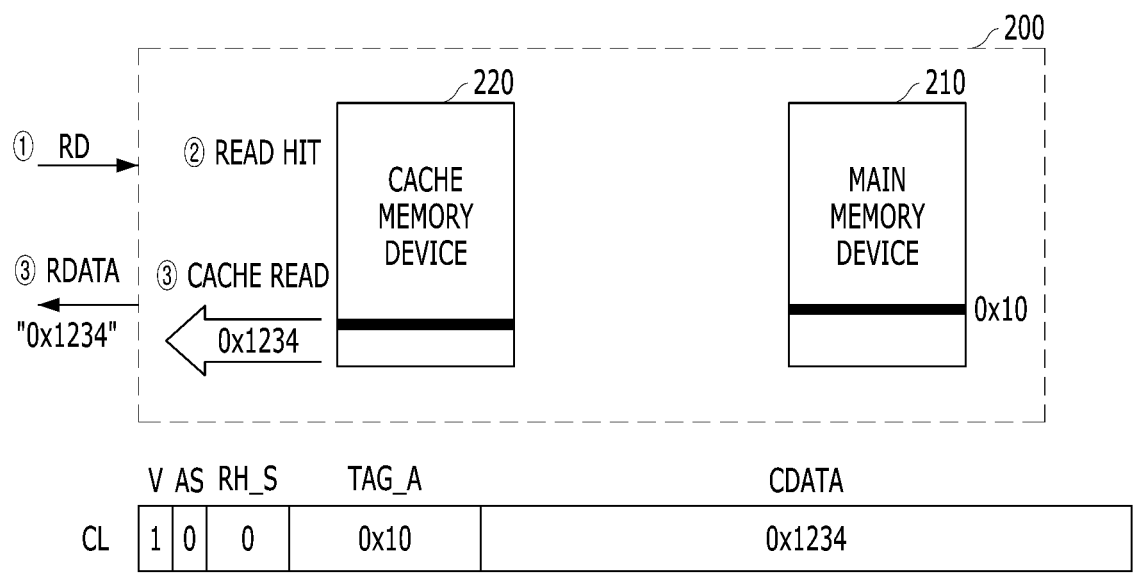

Referring to FIG. 8B, the memory controller 100 may generate a read command RD and an address ADDR of "0x10" corresponding to a request REQ of the host 10 (①). Since the cache-hit cache line is searched (②, "READ HIT") based on the address ADDR of "0x10", the memory controller 100 may check the access selection bit AS and the row hammer state value RH_S. If the access selection bit AS is released to a low bit and the row hammer state value RH_S is "0", then data stored in the row line are identical to the cache data CDATA of the cache-hit cache line, so the memory controller 100 may control the cache memory device 220 to perform a read operation (③) of reading the read data RDATA of "0x1234" from the cache-hit cache line. In this case, since the row line of the main memory device 210 is not accessed, fields of the cache-hit cache line including the row hammer state value RH_S are not updated.

Figure 8C:
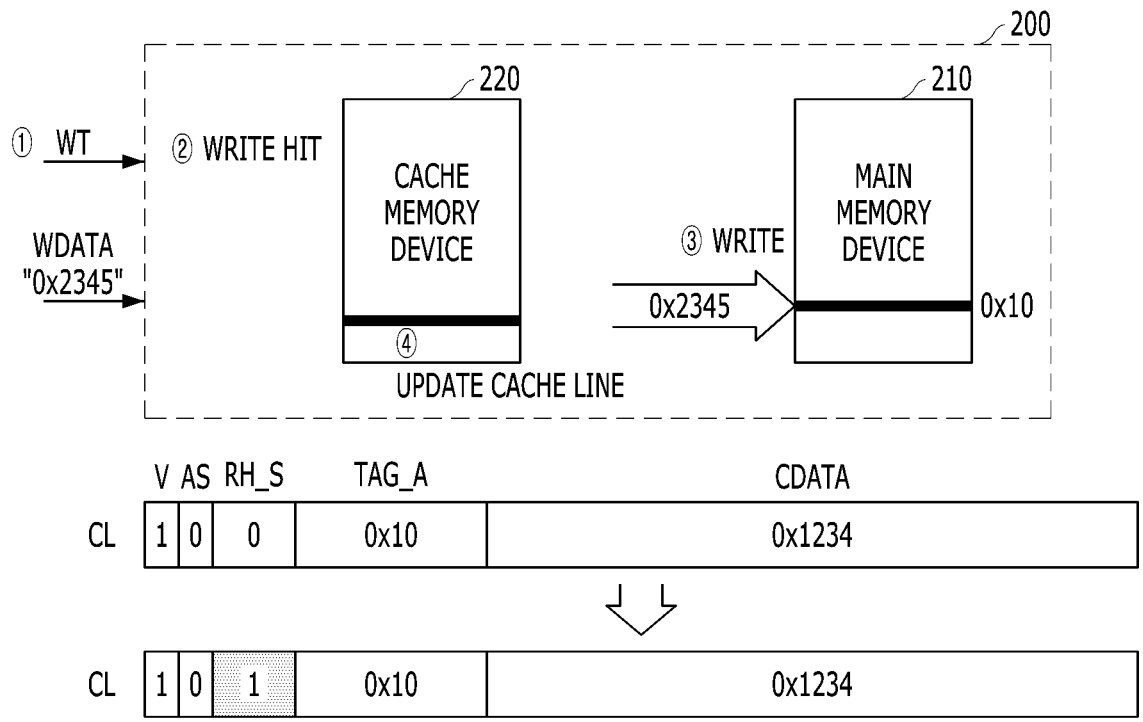

Referring to FIG. 8C, the memory controller 100 may generate a write command WT, an address ADDR of "0x10", and write data WDATA of "0x2345" corresponding to a request REQ of the host 10 (①). Since the cache-hit cache line is searched (②, "WRITE HIT"), the memory controller 100 may check the access selection bit AS and the row hammer state value RH_S. When the access selection bit AS is released to the low bit and the row hammer state value RH_S is "0", the memory controller 100 may control the main memory device 210 to perform a write operation (③) of writing the write data WDATA of "0x2345" in the area selected by the address ADDR of "0x10". After the write operation is performed, the memory controller 100 may update the cache-hit cache line by increasing the row hammer state value RH_S by "+1" (④).

Figure 8D:
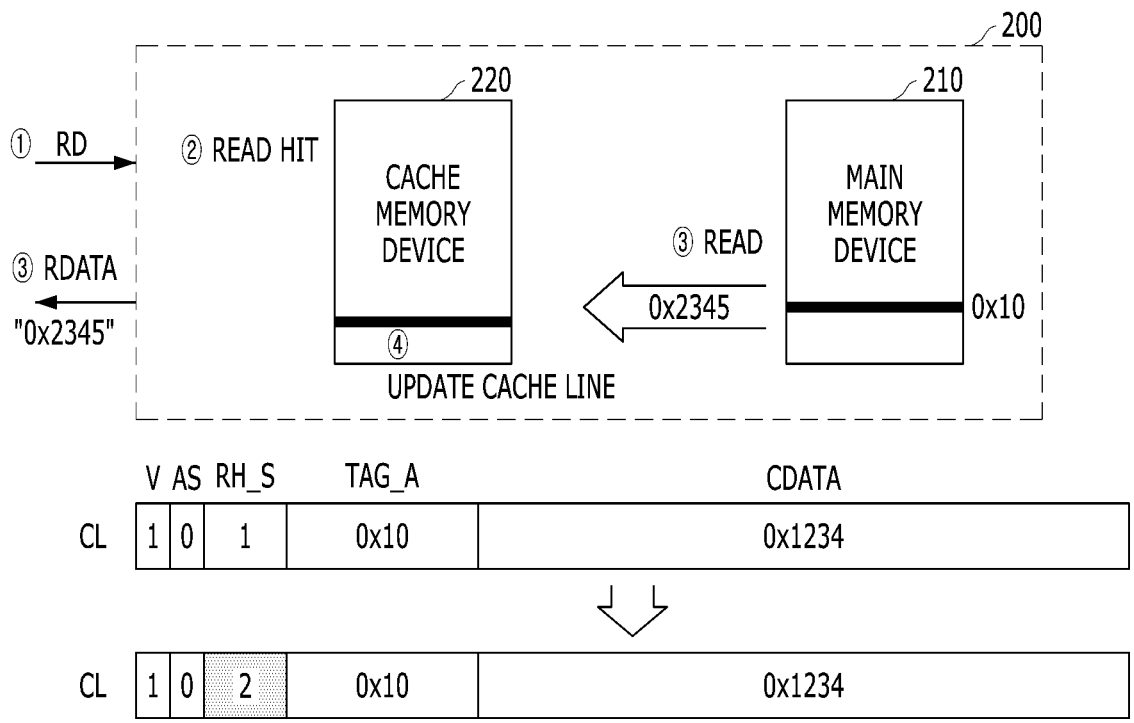

Referring to FIG. 8D, the memory controller 100 may generate a read command RD and an address ADDR of "0x10" corresponding to a request REQ of the host 10 (①). Since the cache-hit cache line is searched (②, "READ HIT"), the memory controller 100 may check the access selection bit AS and the row hammer state value RH_S. When the access selection bit (AS) is released to the low bit and the row hammer state value RH_S is "1", the memory controller 100 may control the main memory device 210 to perform a read operation (③) of reading the read data RDATA of "0x2345" from the area selected by the address ADDR of "0x10". After the read operation is performed, the memory controller 100 may update the cache-hit cache line by increasing the row hammer state value RH_S by "+1" (④).

Figure 8E:
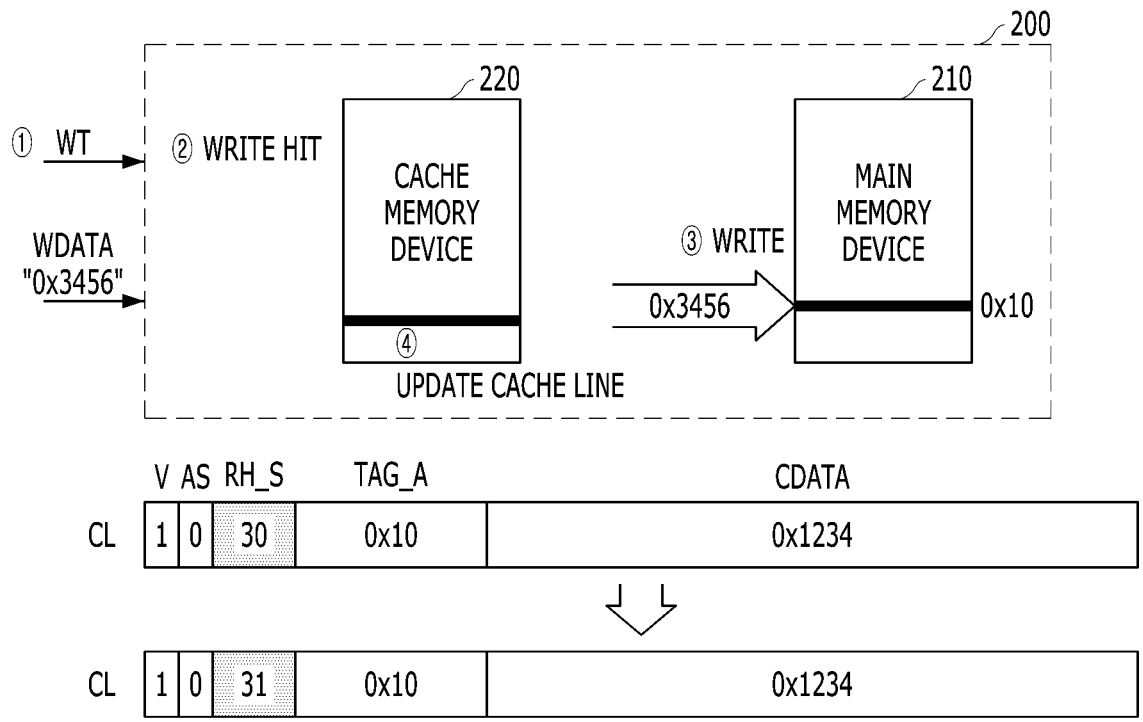

Referring to FIG. 8E, before the row hammer state value RH_S reaches a threshold (e.g., "31"), the cache-hit cache line may be updated (④) by increasing the row hammer state value RH_S by "+1" whenever an access operation is performed on the row line corresponding to the address ADDR of "0x10".

Figure 8F:
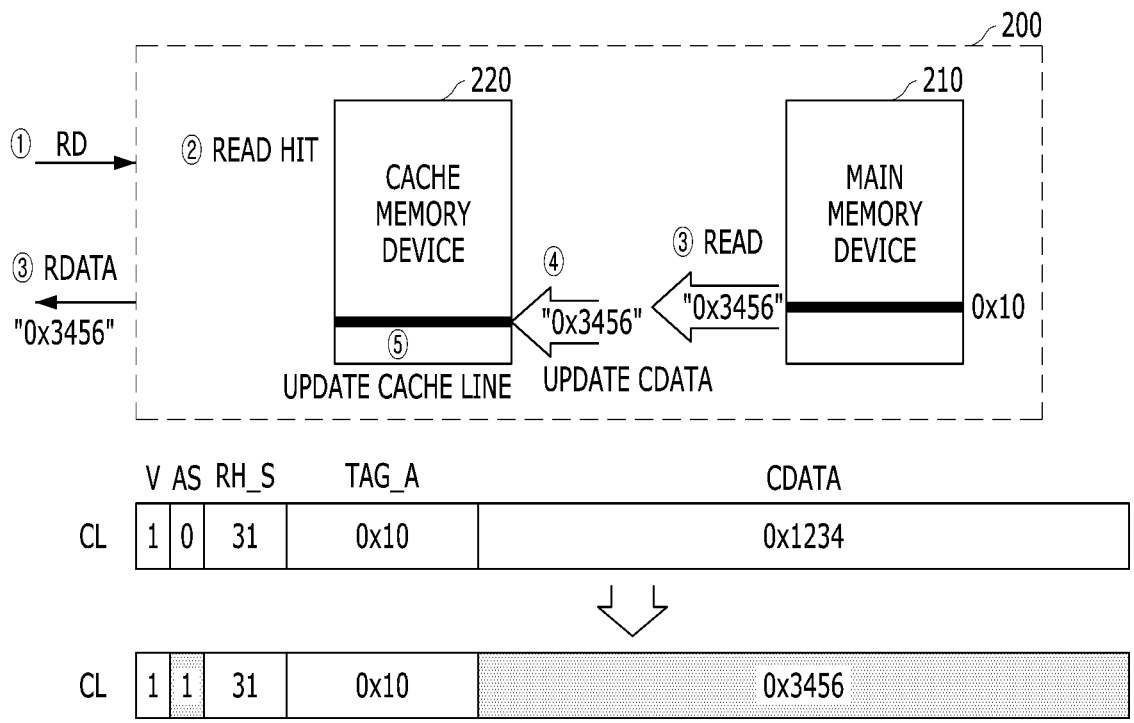

Referring to FIG. 8F, the memory controller 100 may generate a read command RD and an address ADDR of "0x10" corresponding to a request REQ of the host 10 (①). Since the row hammer state value RH_S of the cache-hit cache line has reached the threshold "31" (②), the memory controller 100 may control the main memory device 210 to perform a read operation (③) of reading the read data RDATA of the last stored "0x3456" from the row line corresponding to the "0x10" address ADDR. In addition, the memory controller 100 may update the read data RDATA to the cache data CDATA of the cache-hit cache line (④), and set the access selection bit AS to the high bit (⑤).

Figure 8G:
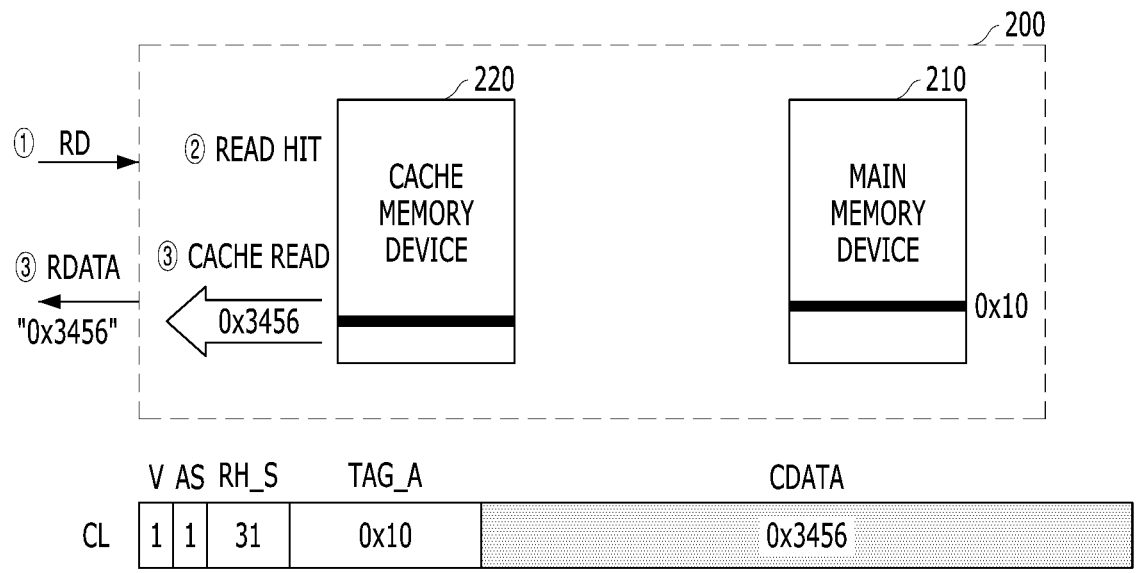
Figure 8H:
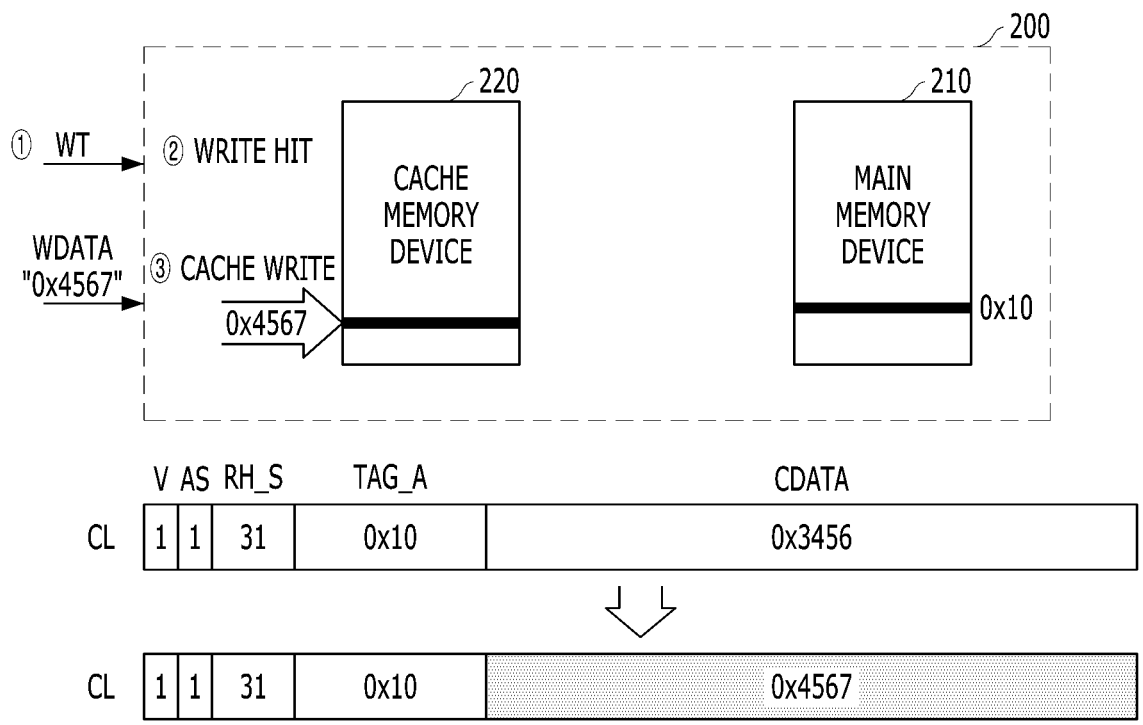

Referring to FIGS. 8G and 8H, after the access selection bit AS is set to the high bit, a read or write operation may be performed only on the cache-hit cache line without accessing the main memory device 210 whenever the read or write operation is performed on the address ADDR of "0x10". Accordingly, the data damage and distortion of the main memory device 210 due to the row hammering may be prevented.

Figure 9:
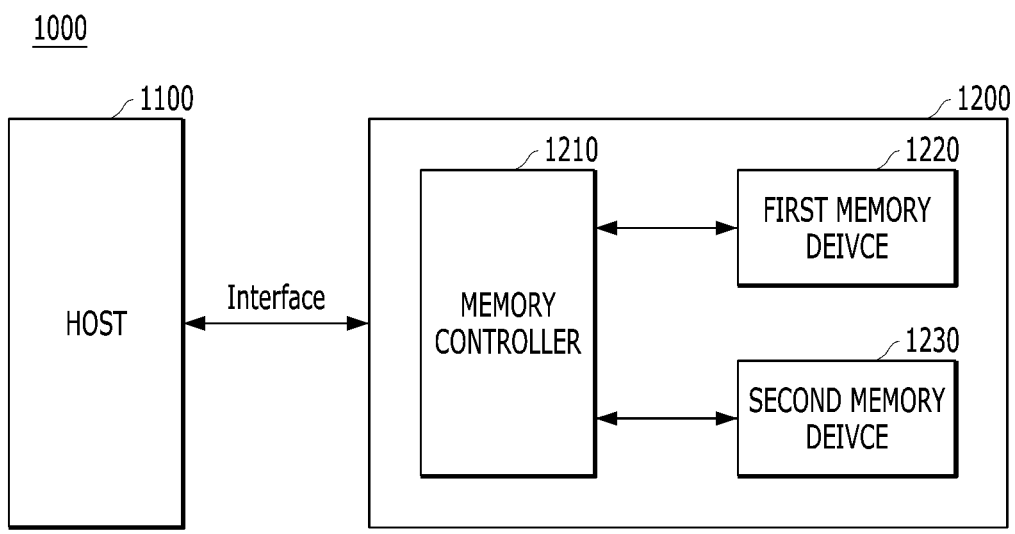
FIG. 9 is a block diagram illustrating a data storage device in accordance with another embodiment of the present disclosure.

FIG. 9 is a block diagram illustrating a data storage device 1000 in accordance with another embodiment of the present disclosure.

Referring to FIG. 9, the data storage device 1000 may include a host 1100 and a memory system 1200. The memory system 1200 may include a memory controller 1210, a first memory device 1220, and a second memory device 1230.

In some embodiments, the memory controller 1210 may communicate with the host 1100 through a Compute eXpress Link (CXL) interface or a Dual Inline Memory Module (DIMM) interface. The memory controller 1210 may have substantially the same configuration as the memory controller 100 of FIG. 2.

In FIG. 9, the first memory device 1220 may be a first tier memory, and the second memory device 1230 may be a second tier memory. The second tier memory may be a memory having a lower priority (i.e., lower tier) than the first tier memory when the host 1100 requests access. The host 1100 may first request necessary data in the first tier memory, and when the data is not in the first tier memory, the host 110 may request data in the second tier memory. If the data requested by the host 1100 is stored in the first or second tier memory, then there may be cache hit, and if not stored in the first or second tier memory, then there may be cache miss.

In an embodiment of the present disclosure, the first memory device 1220 may correspond to the main memory device 210 described in FIGS. 2 to 6, and the second memory device 1230 may correspond to the cache memory device 220 described in FIGS. 2 to 6. Therefore, according to embodiments of the present disclosure, in a memory system communicating with a host through a Compute Xpress Link (CXL) interface, limited memory resources can be efficiently used by managing the access number of row lines using an existing second memory device as a cache memory device.

Figure 10:
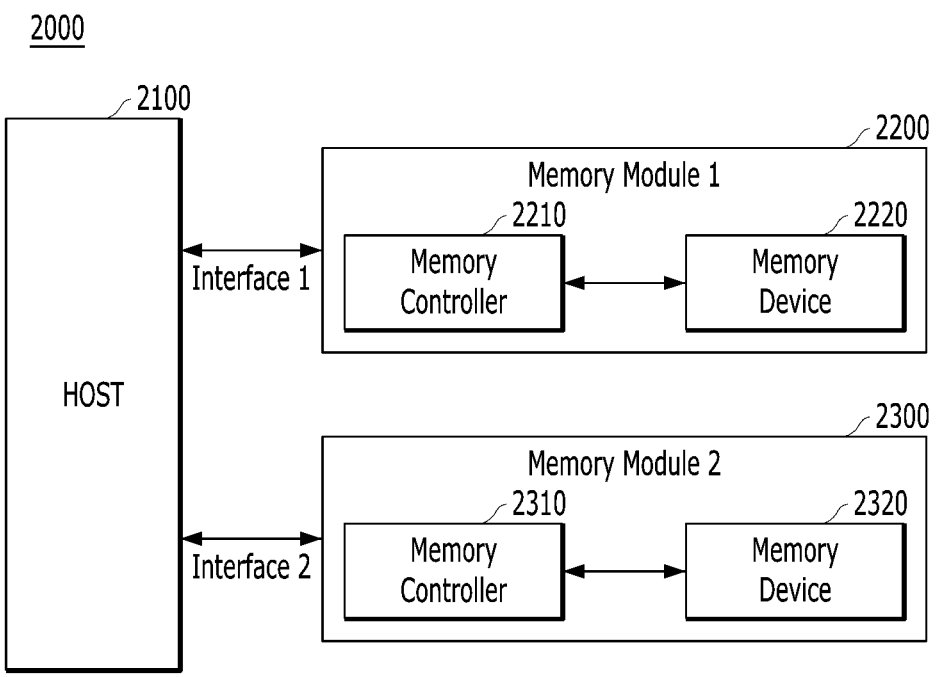
FIG. 10 is a block diagram illustrating a data storage device in accordance with yet another embodiment of the present disclosure.

FIG. 10 is a block diagram illustrating a data storage device 2000 in accordance with yet another embodiment of the present disclosure. In FIG. 10, memory modules are illustrated as an example of a memory system.

Referring to FIG. 10, the data storage device 2000 may include a host 2100, a first memory module 2200, and a second memory module 2300. The number of memory modules included in the data storage device 2000 is not limited to the present embodiment.

The first memory module 2200 includes a memory controller 2210 and a memory device 2220, and may communicate with the host 2100 through a first interface. The second memory module 2300 may include a memory controller 2310 and a memory device 2320, and may communicate with the host 2100 through a second interface. The first interface and the second interface may be different from each other. For example, the first interface may include a Dual In-Line Memory Module (DIMM) interface, and the second interface may include a Compute Express Link (CXL) interface.

In FIG. 10, the first memory module 2200 may be a first tier memory, and the second memory module 2300 may be a second tier memory. The second tier memory may be a memory having a lower priority (i.e., lower tier) than the first tier memory when the host 2100 requests access. The host 2100 may first request necessary data in the first tier memory, and when the data is not in the first tier memory, requests data in the second tier memory. If the data requested by the host 2100 is stored in the first or second tier memory, then there may be cache hit, and if not stored in the first or second tier memory, then there may be cache miss.

At least one of the memory device 2220 and the memory device 2320 may correspond to the memory device 200 described in FIGS. 2 to 6 according to an embodiment of the present disclosure, and may similarly include a corresponding main memory device 210 and cache memory device 220.

Various embodiments of the present disclosure have been described in the drawings and specification. Although specific terminologies are used here, the terminologies are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein. The embodiments may be combined to form additional embodiments.

It should be noted that although the technical spirit of the disclosure has been described in connection with embodiments thereof, this is merely for description purposes and should not be interpreted as limiting. It should be appreciated by one of ordinary skill in the art that various changes may be made thereto without departing from the technical spirit of the disclosure and the following claims.

For example, for the logic gates and transistors provided as examples in the above-described embodiments, different positions and types may be implemented depending on the polarity of the input signal. Furthermore, the embodiments may be combined to form additional embodiments.

What is claimed is:

1. A memory system, comprising:
a main memory device configured to include a plurality of row lines;
a cache memory device configured to include a plurality of cache lines for caching data stored in the row lines, each cache line including cache data, a row hammer state value for storing an access number of a corresponding row line, and an access selection bit set according to the row hammer state value; and
a memory controller configured to control, in response to a request from a host, an access operation to be performed on one of the main memory device and the cache memory device, which is selected according to the access selection bit of a cache-hit cache line.

2. The memory system of claim 1, wherein the memory controller is configured to increase the row hammer state value of the cache-hit cache line when the access operation is performed on a row line corresponding to the request from the host.

3. The memory system of claim 1, wherein the memory controller is configured to set the access selection bit of the cache-hit cache line to a high bit when the row hammer state value of the cache-hit cache line reaches a threshold.

4. The memory system of claim 1, wherein the memory controller is configured
to control the access operation to be performed on the cache-hit cache line when the access selection bit of the cache-hit cache line is a high bit, and
to control the access operation to be performed on the cache-hit cache line or a row line corresponding to the request when the access selection bit of the cache-hit cache line is a low bit.

5. The memory system of claim 4,
wherein the access operation includes a write operation, and
when the access selection bit of the cache-hit cache line is the low bit, wherein the memory controller is configured
to control the write operation to be performed on the row line and increase the row hammer state value of the cache-hit cache line before the row hammer state value of the cache-hit cache line reaches a threshold, and
to control the write operation to be performed on the cache-hit cache line and set the access selection bit of the cache-hit cache line to a high bit when the row hammer state value of the cache-hit cache line reaches the threshold.

6. The memory system of claim 5, wherein, when the row hammer state value of the cache-hit cache line reaches the threshold, the memory controller is configured to read data from the row line and update the read data to the cache data of the cache-hit cache line, and to control the write operation to be performed on the cache-hit cache line.

7. The memory system of claim 4,
wherein the access operation includes a read operation, and
when the access selection bit of the cache-hit cache line is the low bit, wherein the memory controller is configured
to control the read operation to be performed on the row line while controlling the read operation to be performed on the cache-hit cache line only when the row hammer state value of the cache-hit cache line is initialized.

8. The memory system of claim 1, wherein the memory controller is configured to control the access operation to be performed on a row line corresponding to the request and add a cache line corresponding to the row line into the cache memory device when a cache miss occurs.

9. The memory system of claim 8, wherein, the memory controller is configured to perform an eviction operation on a cache line of the cache lines, selected according to a cache replacement policy when the cache memory device is cache-full.

10. The memory system of claim 9, wherein, during the eviction operation, the memory controller is configured to write-back the cache data of the selected cache line to a corresponding row line when the access selection bit of the selected cache line is set to a high bit.

11. The memory system of claim 1, wherein the memory controller is configured to communicate with the host through a Compute eXpress Link (CXL) interface or a Dual Inline Memory Module (DIMM) interface.

12. The memory system of claim 1,
wherein each cache line further includes: a tag address including address information that specifies a location of a corresponding row line, and
wherein the memory controller is configured to search the cache-hit cache line based on the tag address included in each of the cache lines.

13. An operating method of a memory system, comprising:
searching a cache-hit cache line from a plurality of cache lines of a cache memory device when an access operation on a row line of a main memory device is requested from a host;
performing the access operation on one of the main memory device and the cache memory device according to an access selection bit of the cache-hit cache line; and
increasing a row hammer state value of the cache-hit cache line when the access operation is performed on the row line, and setting access selection bit when the row hammer state value reaches a threshold.

14. The operating method of claim 13, the performing the access operation includes:
performing the access operation on the cache-hit cache line when the access selection bit is a high bit; and
performing the access operation on the cache-hit cache line or the row line when the access selection bit is a low bit.

15. The operating method of claim 14,
wherein the access operation includes a write operation, and
when the access selection bit of the cache-hit cache line is the low bit, wherein the performing the access operation includes:

performing the write operation on the row line and increasing the row hammer state value before the row hammer state value reaches a threshold, and performing the write operation on the cache-hit cache line and setting the access selection bit to a high bit when the row hammer state value reaches the threshold.

16. The operating method of claim 15, wherein, when the row hammer state value reaches the threshold, the write operation is performed on the cache-hit cache line after reading data from the row line and updating the read data to cache data of the cache-hit cache line.

17. The operating method of claim 14, wherein the access operation includes a read operation, and when the access selection bit of the cache-hit cache line is the low bit, wherein the performing the access operation includes:

performing the read operation on the row line while controlling the read operation to be performed on the cache-hit cache line only when the row hammer state value is initialized.

18. The operating method of claim 13, wherein the searching a cache-hit cache line further includes:

performing the access operation on the row line and adding a cache line corresponding to the row line into the cache memory device when a cache miss occurs.

19. The operating method of claim 18, wherein the adding a cache line includes:

performing an eviction operation on a cache line of the cache lines, selected according to a cache replacement policy when the cache memory device is cache-full.

20. The operating method of claim 19, further comprising:

writing-back cache data of the selected cache line to a corresponding row line when the access selection bit of the selected cache line is set to a high bit during the eviction operation.

* * * * *